Figure 3:
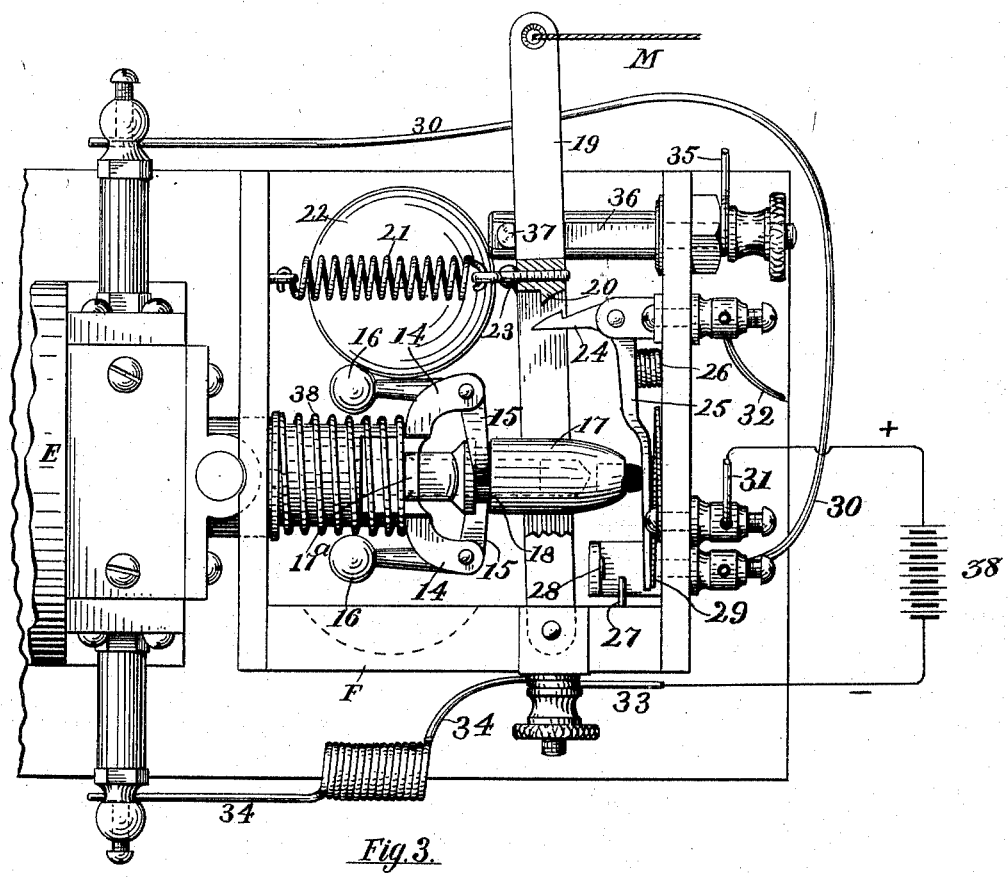

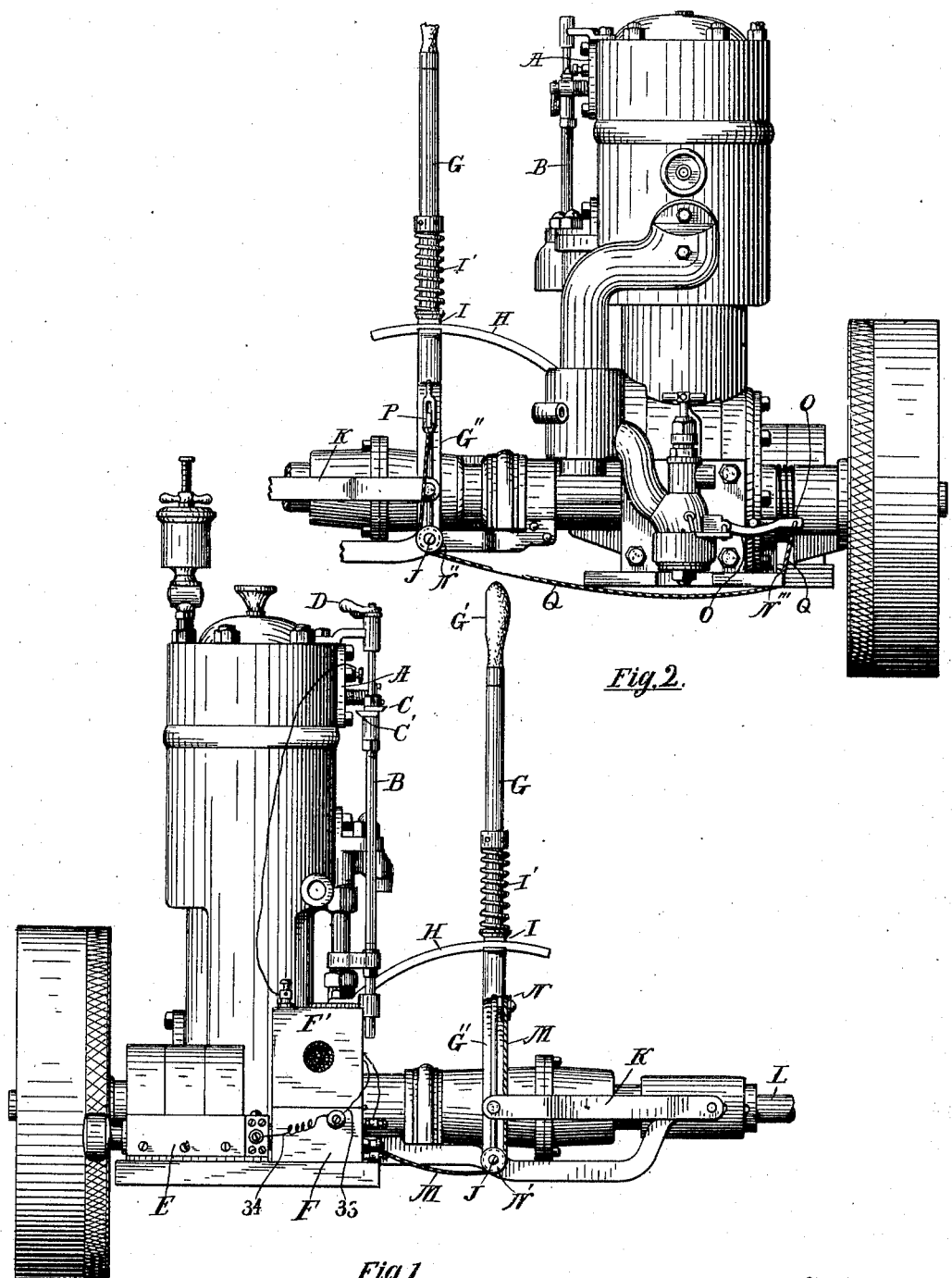

No. 788,594. PATENTED MAY 2, 1905.
W. J. PERKINS.
REVERSING GEAR FOR EXPLOSIVE ENGINES.
APPLICATION FILED SEPT. 22, 1902.

3 SHEETS—SHEET 2.

Witnesses
Palmer A. Jones.
Georgiana Chace.

Inventor
Willis J. Perkins
By Luther V. Moulton
Attorney

No. 788,594. PATENTED MAY 2, 1905.
W. J. PERKINS.
REVERSING GEAR FOR EXPLOSIVE ENGINES.
APPLICATION FILED SEPT. 22, 1902.
3 SHEETS—SHEET 3.
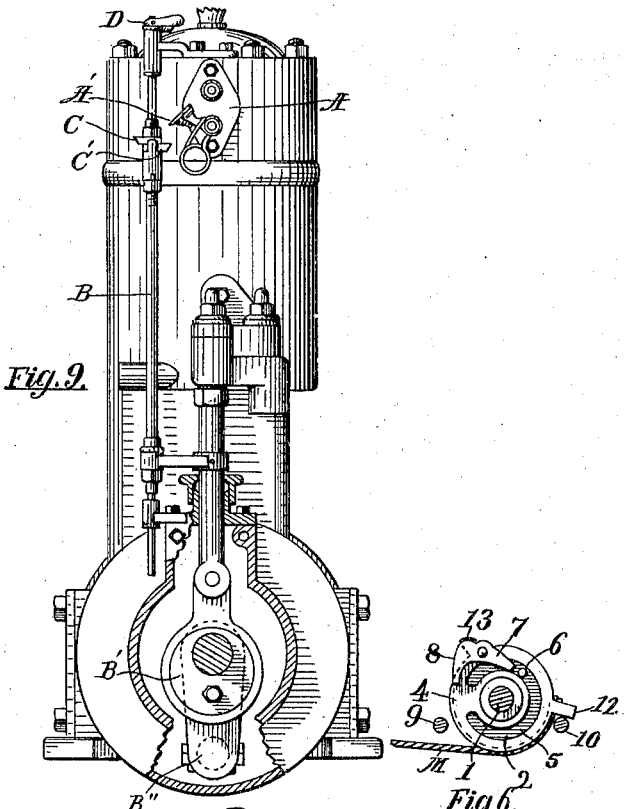
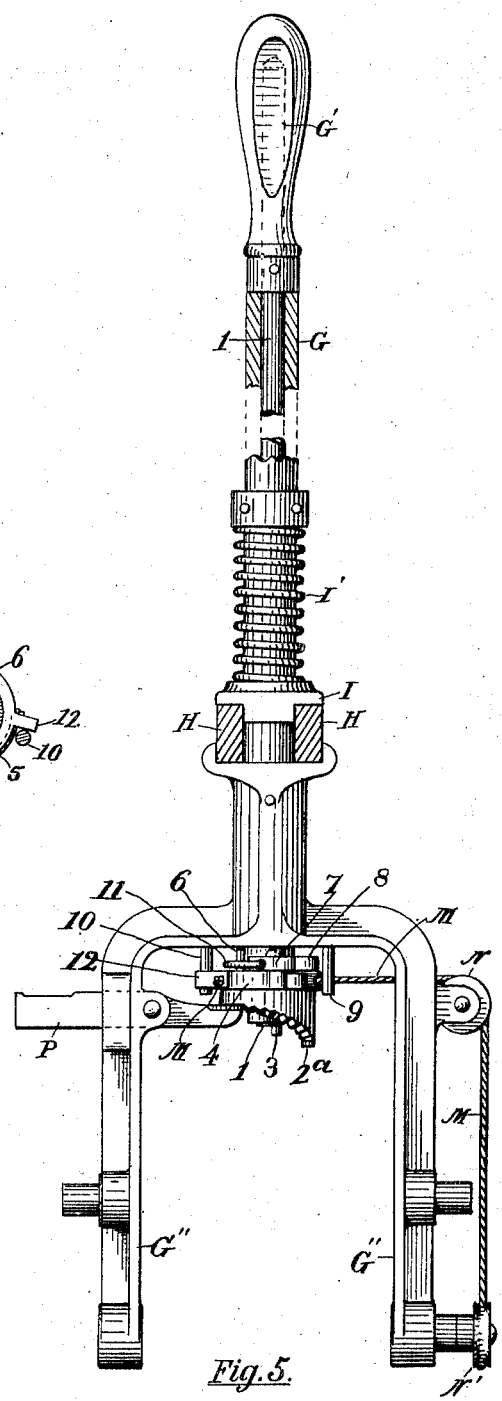
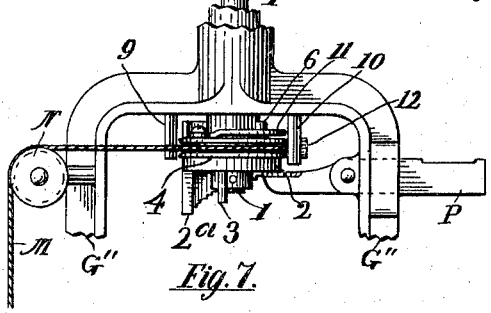
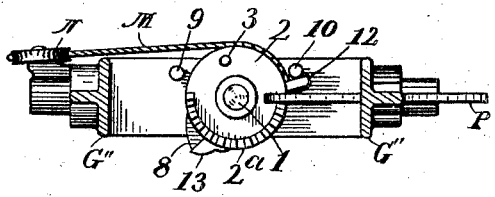
Witnesses
Palmer A. Jones.
Georgiana Chace.
Inventor
Willis J. Perkins
By Luther V. Moulton
Attorney No. 788,594. Patented May 2, 1905.

UNITED STATES PATENT OFFICE.

WILLIS J. PERKINS, OF GRAND RAPIDS, MICHIGAN.

REVERSING-GEAR FOR EXPLOSIVE-ENGINES.

SPECIFICATION forming part of Letters Patent No. 788,594, dated May 2, 1905.

Application filed September 22, 1902. Serial No. 124,277.

*To all whom it may concern:*

Be it known that I, WILLIS J. PERKINS, a citizen of the United States, residing at Grand Rapids, in the county of Kent and State of Michigan, have invented certain new and useful Improvements in Means for Operating Combustible-Vapor Engines; and I do hereby declare the following to be a full, clear, and exact description of the invention, such as will enable others skilled in the art to which it appertains to make and use the same.

My invention relates to improvements in reversing-gear for explosive-engines, and more particularly for operating such engines when used to propel boats, hoisting machinery, &c., where a reverse motion is required. Heretofore such engines have been reversed by separately manipulating the various means for disconnecting the engine, throttling it down, and cutting out and restoring the igniter to action. This requires great dexterity and good judgment to succeed.

The object of my invention is to provide means whereby the engine may be readily disconnected from a propeller-wheel or other driven mechanism or for the purpose of reversing or to cause it to run slowly or to be automatically reversed, as occasion may require, and to provide the device with various new and useful features, hereinafter more fully described, and more particularly pointed out in the claims, whereby the engine can be operated with certainty and requires no special skill or dexterity of manipulation.

The drawings and specification show and describe but a single cylinder. The invention, however, is applicable to two or more cylinders, and I desire to be understood that I do not limit myself to its application to a single-cylinder engine.

My invention consists, essentially, in the combination and arrangement of an operating-lever connected to the clutch that connects the engine and shaft and also connected to the governor or other throttle and to the automatic reversing mechanism, whereby the various operations of connecting and disconnecting the wheel or other driven mechanism and the engine, of throttling the engine down to run slowly, and of operating the automatic reversing mechanism may be done by means of a single lever.

My invention further consists in the automatic mechanism for closing the circuit and restoring the ignition at a proper time to reverse the motion of the engine, all of which will be more fully understood by reference to the accompanying drawings, in which—

Figure 4:
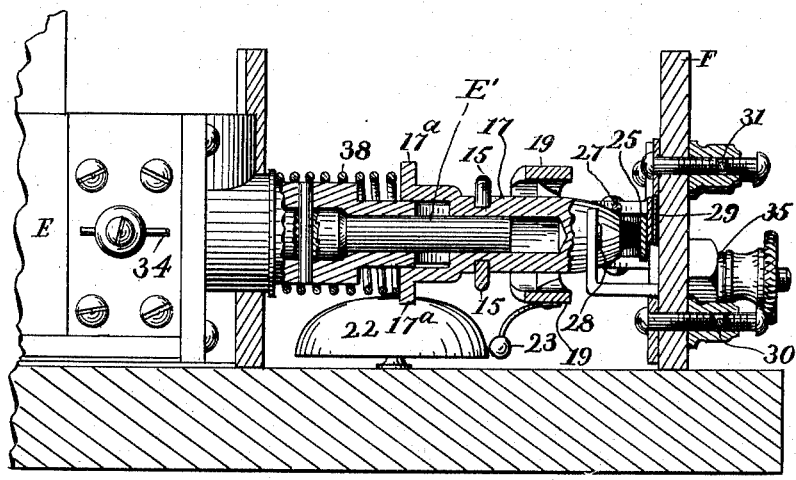

Figure 1 is a front side elevation of a device embodying my invention, together with a combustible-vapor engine; Fig. 2, an elevation of the same at the side opposite to that shown in Fig. 1; Fig. 3, an enlarged detail in plan view of the circuit-shifting and circuit-closing mechanism; Fig. 4, a side elevation of the same, broken away in parts; Fig. 5, an enlarged detail of the operating-lever and parts attached with parts broken away; Fig. 6, a detail in plan view of a portion of the operating-lever; Fig. 7, a portion of the operating-lever viewed from the side opposite to that shown in Fig. 5; Fig. 8, an inverted plan of Fig. 7; and Fig. 9 a rear elevation of the engine, showing the igniter-operating mechanism.

A represents any suitable electric igniter for firing the charge adapted to operate alike with the engine running either way and operated by means adapted to be shifted, so that the charge may be fired earlier when the engine is running fast and later when the engine is running slow, the device shown being an igniter having a suitable dog A', alternately engaged by lugs C and C', mounted on a reciprocating and rotative rod B, operated by an eccentric B', having its full side alined with the crank of the engine and the rod B rotatively adjusted by a lever D to alternately bring the lugs into action, whereby when the lug C is in action the charge is fired earlier and when the lug C' is in action the charge is fired later. I do not herein claim or limit myself to any specific means of shifting the time of firing the charge, as it forms no part of my present invention. Also I do not herein claim the means shown for shifting the electric circuits, the same being reserved for a separate application pursuant to the requirement of the Office.

For operating the igniter when the engine is running at a high speed any convenient form of mechanical generator may be provided and operated by the motion of the engine. I do not limit myself in this respect and for illustration show a portion of a form of magneto-generator, as at E. For convenience the circuit-shifter and reversing mechanism are shown as operated from an extension E' of the shaft of the mechanical generator, as in Fig. 4. It is obvious, however, that the circuit shifting or reversing device may each be operated by any convenient shaft rotating at the proper speed and connected to the engine in any convenient manner and that each can be operated independent of the other.

For operating the igniter at a slow speed when the mechanical generator would be inoperative any suitable battery or other source of electric current 38 is provided and connected to the circuit-shifting mechanism and igniter, as hereinafter described. I prefer to inclose the circuit shifting and closing mechanism in a suitable case F and to provide a box F', hinged to the case and forming a cover for the same, and to place therein a suitable inductive resistance or "spark-coil" interposed in the circuit of the igniter, although said coil may be located at any suitable place.

G is the lever for operating the clutch for controlling and reversing the engine. This lever is pivoted in any convenient manner, preferably to the engine-base, and connected to the clutch by suitable means to operate the same, the form shown being bifurcated at the lower end, as at G'', and pivoted on suitable supports, as at J. At the upper end the lever is provided with a suitable handle G' to operate the same, and for the purpose of adapting it to also serve to throttle the engine down or set the automatic reversing mechanism it has, preferably, one side flattened, as shown, to indicate its position when rotated about its axis. This handle G is also attached to and operates a rod 1, extending and rotative within the lever G and projecting therefrom at the lower end. To operate the throttle, to this rod is attached a cam $2^a$ of suitable form and preferably corrugated to prevent it from slipping back on the lever P, with which it is engaged, said lever being preferably pivoted on the yoke of the operating-lever G and connected to the operating-lever O of any suitable throttle by means of a suitable cord or chain Q, engaging suitable guide-pulleys N'' and N''', whereby when the handle G' is rotated the described means will throttle the engine down and cause the same to run more slowly. The automatic engine-governor may be the throttle, or any suitable separate throttle-valve may be used. I prefer to utilize the engine-governor for this purpose. The lever G is connected to the clutch by means of rods K, whereby as the lever is moved on the pivots J the said clutch will connect or disconnect the shaft L and the engine. To hold the lever in adjusted position, sectors H are provided at each side of the lever, which are engaged by a brake I on the lever, forced into frictional contact with the sectors by a spring I'. Means for connecting the rod 1 with the automatic reversing mechanism is also provided, whereby turning the handle in the direction opposite to that required to throttle the engine the said mechanism is set in operation. The means shown is as follows: Journaled on the rod 1 is a wheel 4, provided with a groove in its edge to receive a cord or chain and also provided with a curved slot 5, concentric with its axis and traversed by a pin 6, fixed in the cam-wheel 2. 7 is a pawl pivoted on the wheel 4 and adapted to engage this pin, whereby the wheel is turned as the rod is rotated in the proper direction to wind the cord M upon the wheel 4. This pawl is provided with an outwardly-projecting shoulder 8, adapted to engage a pin 9, fixed in the lever C, and release the pawl from the pin 6. Opposite to the pin 9 is another pin 10, fixed in the lever G, which pin serves as a stop for a lug 12 on the rim of the wheel 4 to limit the rotation of the wheel. This lug may also serve as a point of attachment for the cord or chain M, which latter extends around suitable pulleys N and N' and thence to the lever 19 of the circuit-shifting mechanism to operate the same.

It is obvious that various equivalent means may be adopted to connect the lever-handle with a throttle to operate the same and also to connect the said lever-handle with the automatic reversing mechanism to set the said mechanism in action. I do not, therefore, limit myself to the particular construction or means shown.

Referring now to Figs. 3 and 4, E preferably represents a portion of a mechanical electric-current generator having its armature-shaft extended, as at E'. 19 is a suitable lever pivoted at one end and having the cord M attached to the other end to move the lever. This lever is provided with a shoulder or catch 20, adapted to be engaged by a pivoted detent 24, having an arm 25 extending opposite to the end of the shaft E', on which shaft is mounted a longitudinally-movable sleeve 17, adapted to engage the lever 25 and release the detent 24, and also provided with suitable insulation between itself and said lever. This sleeve is moved toward the lever 25 by means of a spring 38, preferably surrounding the shaft and engaging lugs $17^a$ on the inner end of the sleeve. The sleeve is retracted against the yielding resistance of the spring by means of a suitable governor, the usual centrifugal form being shown and consisting of bell-crank levers 15, engaging a groove 18 in the sleeve at their inner ends and pivoted in arms 14, projecting from the shaft E' and provided at their ends with weights 16, which weights are moved outward by centrifugal force when rapidly rotated, and thus operate the levers to compress the spring and retract the sleeve. Obviously any form of governor adapted to change rotary to longitudinal motion may be used. One source only of electrical energy may be used and the mechanical generator E dispensed with. The spring 26 engages the detent with the shoulder or catch 20 and also causes the arm 25 to follow the sleeve 17 until arrested by engagement with a terminal 28, connected by a conductor 30 to the mechanical generator E, thus closing the circuit of said generator. A conductor 31 connects any suitable battery or auxiliary source of electricity adapted to operate independent of the engine with a movable terminal preferably consisting of a conductive spring 29, yieldingly engaging the arm 25 and adapted to follow the arm until arrested by a stop-pin 27 shortly before the said arm contacts the terminal 28. Another conductor, 33, connects the battery 38 or auxiliary source of electricity with the lever 19. Said lever is also connected with the mechanical generator E by a conductor 34. A post 36 is connected to a ground-wire or negative conductor 35 and is provided with a terminal 37 to engage the lever 19 when the detent 24 is released. This lever is held yieldingly in contact with the terminal 37 by a spring 21. Another conductor, 32, connects the arm 25 with the igniter to operate the latter. 22 is an alarm-bell, and 23 a hammer operated by the lever 19. This hammer strikes the bell when the lever 19 is released and brought into contact with the terminal 37 to notify the operator that the circuit is restored and the igniter in action.

The operation of the device is as follows: The engine is preferably started without a load by disconnecting the clutch, and the rod B turned to bring the lug C' in operative position to fire the charge late and prevent reversing the engine. After the engine is under headway the rod B is turned a half-revolution, whereby the lug C operates to fire the charge earlier and prior to the time that the crank reaches the upper center. By grasping the handle G' and rotating the same to the right the speed of the engine will be reduced, as heretofore described. In the event that it is desired to reduce the speed quite low it will be necessary to turn the rod B and bring the lug C' into action to prevent the early firing of the charge from reversing the engine. If, however, it is desired to reverse the engine, the clutch connecting the engine and shaft L preferably is first released and the engine allowed to run ahead at full speed without a load, (although in practice it is found that the engine may be reversed with a load on.) The handle G' is then turned to the left, which winds the cord M upon the wheel 4 and moves the lever 19 away from the pin 37 and engages the detent 24 with said lever, thus holding the circuit open and preventing the firing of the charge in the engine. As soon as the detent is engaged the shoulder 8 engages the pin 9 and releases the wheel 4, thus preventing interference with the action of the automatic reversing mechanism by holding the handle in this turned position. As the speed of the engine runs down to the proper point to be reversed by the early firing of the charge the sleeve 17 will be moved outward upon the shaft E' by the action of spring 38, and its insulated end will engage with the arm 25, and thus release the detent. The spring 21 now brings the lever 19 back in contact with the terminal 37, thus closing the circuit, and at the same time strikes the bell 22 to indicate that the circuit has been closed. The engine will now reverse, as the first charge is fired considerably before the crank passes the center, and the speed generated by the first operative explosion will be sufficient to carry it over the center at the next reverse revolution. The engine will thus proceed to gain headway in the opposite direction. The device is thus capable of automatically reversing the engine regardless of the function of shifting the circuits, and any novice can manipulate the handle G' as well as an expert. So much of the device as performs the function of automatically reversing the engine can therefore be used with any convenient single source of electric currents. However, owing to the fact that all chemical electrical generators are quickly exhausted, and therefore not well adapted for constant use, and also that they operate independent of the motion of the engine and are therefore available when the engine is running too slow to properly operate a mechanical generator I prefer to also provide some means of automatically shifting the circuits whereby a mechanical generator will be brought into action when the engine is running fast and a chemical generator or other source of electric current operating independent of the speed of the engine will be brought into action when the engine is running slowly. The circuits are shifted automatically whenever the speed changes, as follows: When the engine is running slowly, the sleeve 17 is thrust outward by the action of the spring 38, as shown in the drawings, carrying the arm 25 against the spring-terminal 29. The battery or other source is thus connected with the igniter through the conductor 31, spring-terminal 29, the arm 25, and the conductor 32, the balance of the circuit being through the ground-conductor 35, post 36, terminal 37, lever 19, and conductor 33. As the speed of the engine increases the sleeve 17 is retracted by the levers 15, the arm 25 follows the same by the action of the spring 26, and the spring-terminal 29 follows the arm 25, the battery connection being thus maintained until the spring-terminal 29 is stopped by the pin 27. A slight increase of speed now brings the arm 25 in contact with the terminal 28, and as long as the speed is maintained at or above the rate sufficient to hold the sleeve 17 back from the arm 25 this contact will be maintained. The circuit is now from the mechanical generator E through the conductor 30, the terminal 28, the arm 25, and the conductor 32 to the igniter, and thence by the way of the ground-conductor 35, post 36, terminal 37, lever 19, and conductor 34 to the generator. The stop 27 and the terminal 28 are so adjusted that a slight movement of the arm 25 will connect it respectively with these respective terminals and shift the circuits, and this change of circuits is adjusted to occur at the time the speed is sufficient or higher than necessary to properly operate the mechanical generator.

It is obvious that a governor and a circuit-closer held open by a detent and released by the governor can be used for reversing the engine without the circuit-shifting means, or the governor and the circuit-shifting mechanism can be used for alternately connecting two different circuits as the speed changes without the circuit-closing mechanism for reversing the engine.

I do not limit myself to the specific construction herein shown and described. Many and various modifications and equivalents of the same may be adopted without departing from the spirit of my invention.

Having thus described my invention, what I claim, and desire to secure by Letters Patent, is—

1. In combination with an explosive-engine and an igniter adapted to fire the charge before the crank of the engine reaches the dead-center, means for manually throwing the igniter out of action, and means automatically operated by the engine for restoring the igniter to action.

2. In combination with an explosive-engine and an electric igniter for the same, means for manually opening the electric circuit of the igniter, and means for automatically closing said circuit, said closing means being operated by the engine when the speed of the same is reduced.

3. The combination of an explosive-engine, an igniter for the engine, a manually-operated lever to throw the igniter out of action, a detent to hold said lever, a spring to move the lever and restore the igniter to action, and means for releasing the detent automatically operated by the engine, when the speed of the engine is reduced.

4. The combination of an explosive-engine, an electric igniter, a manually-opened circuit-breaker in the igniter-circuit a spring to close the circuit-breaker, a detent to hold the circuit-breaker open, and a centrifugal governor to release the detent and operated by the engine.

5. The combination of an explosive-engine, an electric igniter, a circuit-breaker, a rotative rod, a wheel journaled on the rod, a pawl to turn the wheel, a stop to release the pawl, means for connecting the wheel to the circuit-breaker to open the same, and means operated by the engine to automatically close the circuit-breaker.

6. The combination of an explosive-engine, an electric igniter, a circuit-breaker in the igniter-circuit, a rotative rod, a wheel journaled on the rod, a pin moved by the rod, a pawl on the wheel to engage the pin, a fixed stop to release the pawl, and means for connecting the wheel to the circuit-breaker to operate the same.

7. The combination of an explosive-engine, an igniter for the same, a pivoted lever in the igniter-circuit, manually-operated means for moving the lever in one direction, and a spring to oppositely move the lever, a detent to hold the lever, a centrifugal governor operated by the engine, and a sleeve operated by the governor to engage the detent and release the lever.

8. The combination of an explosive-engine, an electic igniter, a pivoted lever in the igniter-circuit, a spring attached to the lever to close the circuit, a detent to engage the lever and hold the circuit open, a rotative rod, a wheel journaled on the rod, a pawl to rotate the wheel, a stop to engage the pawl and release the wheel, means for connecting the wheel to the lever to operate the same, a movable sleeve to engage the detent and release the same, a centrifugal governor to operate the sleeve and rotated by the engine.

9. The combination of an explosive-engine, an igniter, a lever to throw the igniter out of action, a detent to hold the said lever, a spring to move the same and restore the igniter to action, means for releasing the detent operated by the engine when the speed of the same is sufficiently reduced to reverse the engine by the first explosion therein, a clutch connecting the engine to a shaft, and a manually-operated lever connected to the clutch and to the first-named lever to operate both of the same.

10. The combination of an explosive-engine, an electric igniter, circuit-breaker in the igniter-circuit, a spring to close the circuit-breaker, a detent to hold the same open, a centrifugal governor to release the detent and operated by the engine, a clutch connecting the engine to a shaft and a manually-operated lever connected to the clutch and to the circuit-breaker to operate both of the same.

11. In combination with an explosive-engine, an igniter for the same, and a clutch connecting the engine to a shaft; a circuit-breaker in the igniter-circuit, a pivoted lever connected to the clutch to operate the same, a rotative rod on the lever, a wheel mounted on the rod and connected to the circuit-breaker to open the same, and a centrifugal governor operated by the engine and adapted to close the circuit when the speed of the engine is reduced.

12. In combination with an explosive-engine, an igniter, for the same, and a clutch connecting the engine to a shaft, a circuit-breaker in the igniter-circuit, a pivoted lever connected to the clutch to operate the same, a rotative rod in the lever, a wheel journaled on the rod and connected to the circuit-breaker to open the same, a pawl to rotate the wheel, a pin moved by the rod and engaging the pawl, a stop to engage and release the pawl, and means for automatically closing the circuit when the speed of the engine is decreased.

13. In combination with an explosive-engine, an electric igniter, and a clutch connecting the engine to a shaft; a circuit-breaker in the igniter-circuit, a spring to close the circuit, a detent to hold the circuit open, a centrifugal governor to release the detent and operated by the engine, a pivoted lever connected to the clutch to operate the same, a rod rotative in the lever, a wheel journaled on the rod and connected to the circuit-breaker to open the same, a pawl on the wheel, a pin moved by the rod and engaging the pawl, and a fixed stop to engage and release the pawl.

14. The combination of an explosive-engine, an igniter, a clutch connecting the engine to a shaft, a lever adapted to operate the clutch, a spring-actuated lever to close the igniter-circuit, means for connecting the clutch-operating lever with said spring-actuated lever, a detent to hold the spring-actuated lever, and open the igniter-circuit, and a centrifugal governor to release the detent, when the speed of the engine has decreased.

15. The combination of an explosive-engine, an electric igniter, a clutch connecting the engine to a shaft, a pivoted and rotative lever connected to the clutch to operate the same, an electric circuit to operate the igniter, a circuit-breaker in the circuit, a wheel on the lever, means for connecting the wheel and circuit-breaker, a detent to hold the circuit-breaker open, an arm on the detent, a centrifugal governor, and a sleeve operated by the governor and adapted to engage the arm and release the detent when the speed of the engine is decreased.

16. In combination with an explosive-engine, an igniter and a throttle; a rotative rod, a wheel fixed on the rod and connected to the throttle, a wheel journaled on the rod and connected to means for throwing the igniter out of action, a pawl to connect the wheels, a stop to release the pawl, and means for automatically restoring the igniter to action and operated by the engine, when the speed of the engine decreases.

17. The combination of an explosive-engine, an igniter for the engine, a manually-operated lever to throw the igniter out of action, a detent to hold the said lever, a spring to move the lever and restore the igniter to action, means for releasing the detent automatically operated by the engine when the speed of the same is reduced, a throttle for the engine and a manually-operated lever connected to said throttle and to the first-named lever to operate both of the same.

18. The combination of an explosive-engine, an electric igniter, a circuit-breaker in the igniter-circuit, a spring to close the circuit-breaker, a detent to hold the same open, a centrifugal governor to release the detent and operated by the engine, a throttle for the engine and a lever connected to said throttle and to the circuit-breaker to operate both of the same.

19. The combination of an explosive-engine, a throttle, an electric igniter, a circuit-breaker for the igniter, a rotative rod, a cam on the rod, a lever operated by the cam and connected to the throttle to operate the same, a wheel journaled on the rod, a pawl to rotate the wheel, a fixed stop to release the pawl, and means for connecting the wheel to the circuit-breaker to open the same.

20. In combination with an explosive-engine, an electric igniter and a throttle, a circuit-breaker, a rotative rod, a serrated cam fixed on the rod, a pivoted lever engaged by the cam and connected to the throttle to operate the same, a wheel journaled on the rod and connected to the circuit-breaker to operate the same, a pawl on the wheel, a pin in the cam engaging the pawl and a fixed stop to engage the pawl.

21. In combination with an explosive-engine, an electric igniter and a throttle, a pivoted lever in the igniter-circuit, a spring attached to the lever to close the circuit, a detent engaging the lever to hold the circuit open, a centrifugal governor operated by the engine to release the detent, a rotative rod, a wheel journaled on the rod and connected to the said lever to open the circuit, a cam fixed on the rod, a pin on the cam, a pawl on the wheel engaged by the pin, a fixed stop to engage the pawl and a pivoted lever operated by the cam and connected to the throttle to operate the same.

22. The combination of an engine, a throttle for the engine, a rod rotated on its axis, a serrated cam on the rod, a lever operated by the cam, and means for connecting the lever with the throttle, whereby the throttle is operated by rotating the rod.

23. The combination of an engine, a throttle, a clutch connecting the engine with a shaft, a lever pivoted at one end, and rotative about its longitudinal axis, and means for connecting the lever to the clutch and to the throttle, whereby the lever operates the clutch when turned on the pivot, and operates the throttle when turned on its axis.

24. In combination with an engine, a clutch connecting the engine to a shaft, and a throttle for the engine; a pivoted lever connected to the clutch to operate the same, a rod rotative in the lever, and means for transmitting motion from the rod to the throttle, whereby the throttle is operated by the rotation of rod.

25. In combination with an engine, a clutch connecting the engine to a shaft, and a throttle for the engine; a pivoted lever connected to the clutch to operate the same, a rod rotative in the lever, a cam mounted on the rod and rotated thereby, a lever mounted on the first-named lever and engaged by the cam, and means for connecting the last-named lever to the throttle to operate the same.

26. In combination with an explosive-engine, an igniter, a throttle and a clutch; a manually-operated pivoted and rotative lever connected to the clutch to operate the same when moved about its pivot, means for transmitting motion from the said lever to the throttle when the lever is rotated about its axis, in one direction, means for cutting out the igniter connected to the said lever and operated by the rotation of the lever in the opposite direction, and means for automatically restoring the action of the igniter when the speed of the engine decreases.

27. The combination of an explosive-engine, an igniter for the engine, a lever to throw the igniter out of action, a detent to hold the said lever, a spring to move the lever and restore the igniter to action, means for releasing the detent operated by the engine when the speed of the same is reduced, a clutch to connect the engine to a shaft, a throttle for the engine, a lever connected to the clutch and to the throttle, and to the first-named lever to operate all three of the same.

28. In combination with an explosive-engine, a clutch, an electric igniter, a throttle, and a circuit-breaker; a pivoted lever rotative about its longitudinal axis, means for connecting the lever to the clutch to operate the same by the pivotal movement of the lever, means for operating the throttle by a rotary movement of the lever in one direction, means for opening the circuit-breaker by rotary movement of the lever in the opposite direction, a detent to hold the circuit-breaker open, and a centrifugal governor operated by the engine to release the detent when the speed of the engine decreases.

29. In combination with an explosive-engine, a clutch, a throttle, an igniter, and a circuit-breaker; an operating-lever pivoted at one end and rotative about its longitudinal axis, means for connecting the said lever and the clutch, a cam on the operating-lever, a lever engaged by the cam, means for connecting the last-named lever and the throttle, a wheel journaled on the operating-lever, means for connecting the wheel to the circuit-breaker, a detent to hold the circuit-breaker open and automatic means for closing the circuit-breaker when the speed of the engine is decreased.

30. In combination with an explosive-engine, an electric igniter, a circuit-breaker in the igniter-circuit, a throttle, and a clutch connecting the engine with a shaft; a pivoted operating-lever connected to the clutch to operate the same, a rod rotative in the lever, a cam fixed on the rod, a lever engaged by the cam and connected to the throttle, a wheel journaled on the rod, a pawl to connect the cam and wheel, a stop to engage and release the pawl, and a cord or chain connecting the wheel and the circuit-breaker.

31. In combination with an explosive-engine, an electric igniter, a circuit-breaker, a throttle, and a clutch connecting the engine and shaft; a detent to hold the circuit-breaker open, a centrifugal governor to release the detent, a pivoted and bifurcated lever to operate the clutch, a rod having an operating-handle and rotative in the lever, a serrated cam on the end of the rod, a lever pivoted on one member of the bifurcated lever and connected to the throttle, a wheel journaled on the rod, a cord attached to the wheel at one end and to the circuit-breaker at the other end, a pawl to connect the cam and wheel, and a pin on the operating-lever to engage and release the pawl.

32. In combination with an explosive-engine, an electric igniter, a circuit-breaker, a throttle, and a clutch; a pivoted operating-lever connected to the clutch to operate the same, a rod rotative in said lever and having an operating-handle at one end, a serrated cam fixed on the other end of the rod, a lever pivoted on the operating-lever and connected to the throttle and engaged by the cam, a wheel rotative on the rod, a pawl pivoted on the wheel, a pin in the cam engaging the pawl, a stop on the operating-lever to engage and release the pawl, a cord connecting the circuit-breaker and the wheel, and means operated by the engine for automatically closing the circuit-breaker, when the speed of the engine is decreased.

33. In combination with an explosive-engine, a clutch, an electric igniter, a circuit-breaker, and a throttle; a pivoted and bifurcated operating-lever, rods connecting the said lever and the clutch, a rod rotative in the operating-lever, an operating-handle on the rod to rotate the same; a downwardly-projecting serrated cam on the rod, a lever pivoted on the operating-lever and engaging the cam and connected to the throttle to operate the same, a wheel rotative on the rod and having a curved slot, a cord connecting the wheel and the circuit-breaker, a pin in the cam and traversing the slot, a pawl pivoted on the wheel and engaging the pin, a stop on the operating-lever to engage and release the pawl, a detent to hold the circuit-braker open, a centrifugal governor operated by the engine to release the detent, and a spring to close the circuit.

34. In combination with a combustible-vapor engine, and means for reversing the same comprising a movable circuit-breaker manually operated to open the circuit, means for closing the circuit and automatically operated by the engine, a bell, and a hammer attached to the circuit-closing means and adapted to strike the bell when the circuit is closed.

35. In combination with a combustible-vapor engine, and means for reversing the same comprising a movable lever in the electric circuit of the igniter and manually operated to open the circuit, a detent to hold the circuit open, and a centrifugal governor operated by the engine to release the detent and a spring to close the circuit; a bell near the lever, and a hammer attached to the lever and adapted to strike the bell when the circuit is closed.

36. In an explosion-engine, the combination with ignition devices, of means for placing them out of action, a speed-responsive governor driven by the engine, and devices operated by the governor when the speed falls to a proper extent below normal which throw the ignition devices into operation and thereby cause a spark at the proper time to reverse the engine.

37. In an explosion-engine, the combination with a speed-responsive governor driven by the engine, of ignition devices, means for throwing them out of operation while the engine is running and devices operated by the governor when the speed falls to a proper extent below the normal for throwing the ignition devices into action and thereby causing a spark at the proper time to automatically reverse the engine.

38. In an explosion-engine, the combination with a speed-responsive governor driven by the engine, of electrical ignition devices, means for breaking the circuit of the ignition devices to throw them out of operation, and devices operated by the governor when the speed falls to a proper extent below normal for closing the circuit of the ignition devices at the proper time to cause a spark and to thus reverse the engine.

39. In an explosion-engine, the combination with a speed-responsive governor driven by the engine, of ignition devices, means for throwing them out of operation while the engine is running and devices operated by the governor when the speed falls to the proper extent below normal for automatically bringing the ignition devices back into action and producing a spark at a time when the piston is just completing an instroke and before the crank has passed its dead-center on the instroke to thus reverse the engine.

40. In an explosion-engine, the combination with a speed-responsive governor driven by the engine, of electrical ignition devices, means for breaking the circuit of the ignition devices while the engine is running and devices automatically operated by the governor when the speed falls to a proper extent below normal for again closing the circuit of the ignition devices and thus causing a spark at a time when the piston of the engine is just completing its instroke and before the crank has passed its dead-center on the instroke to thus reverse the engine.

In testimony whereof I affix my signature in presence of two witnesses.

WILLIS J. PERKINS.

Witnesses:
PALMER A. JONES,
LUTHER V. MOULTON.